United States Patent [19]

Buckethal

[11] 3,969,055
[45] July 13, 1976

[54] INJECTION MOLD CONTROL SYSTEM
[75] Inventor: Paul J. Buckethal, Villa Hills, Ky.
[73] Assignee: Globe-Union Inc., Milwaukee, Wis.
[22] Filed: Dec. 17, 1973
[21] Appl. No.: 425,302

[52] U.S. Cl. ............................. 425/145; 425/146;
425/149; 425/166; 425/248
[51] Int. Cl.² .......................................... B29F 1/06
[58] Field of Search ............ 425/149, 146, 145, 166

[56] References Cited
UNITED STATES PATENTS

| | | |
|---|---|---|
| 3,473,197 | 10/1969 | Wilds et al. ........................ 425/249 |
| 3,597,794 | 8/1971 | Mann ............................. 425/145 X |
| 3,767,339 | 10/1973 | Hunkar ........................... 425/149 X |
| 3,807,914 | 4/1974 | Paulson ............................. 425/149 |
| 3,819,777 | 6/1974 | Vermeerbergen .............. 425/145 X |
| 3,820,928 | 6/1974 | Lemelson .......................... 425/146 |
| 3,820,928 | 6/1974 | Hehl ................................. 425/146 |
| 3,840,312 | 10/1974 | Paulson ............................. 425/145 |

Primary Examiner—Robert D. Baldwin
Assistant Examiner—David S. Safran
Attorney, Agent, or Firm—Neuman, Williams, Anderson & Olson

[57] ABSTRACT

A system and method for controlling the injection of material through two or more gates into the cavity of injection-molding apparatus. In this system, a sensor develops an indication of unbalanced flow conditions produced by the injection of the material into the cavity of the mold. A regulator also forms part of the system and serves to adjust the relative amounts of material passing through the gates. The method includes sensing unbalanced flow conditions produced by the material injected into the cavity and adjusting the relative amounts of materials injected into the cavity through the various gates.

16 Claims, 9 Drawing Figures

INJECTION MOLD CONTROL SYSTEM

BACKGROUND

In the injection molding of plastic objects, the cavity formed from the walls or surfaces which define the shape of the object to be molded often has two or more openings or gates through which the plastic material enters the cavity. The several openings provide for better control of the cooling conditions around the gates and a more even flow of the injected material under less pressure to the extremities of the cavity.

However, utilizing several openings for the injection of the plastic imposes additional requirements upon the molding process. The necessity of maintaining a balanced flow of plastic throughout the cavity stands foremost amongst these. An unbalanced flow creates several problems. First, in a balanced flow the plastic flows generally along predetermined lines which, in objects having corners, compartmentalizing walls, and other irregular features, preclude the development of stresses in the molded product. Having more plastic than desired passing through some of the gates with less passing through the others results in an unbalanced flow. In such an unbalanced flow, the plastic approaches various locations in the cavity from undesired directions which, in the final object, will create stresses.

Second, injection-molding apparatus generally includes a cantilever-mounted core. Placing the core within the cavity half of the mold defines the cavity corresponding to the structure of the desired object. Further, with multicompartmented molded objects, such as battery cases, the core includes several elements each of which has a cantilevered mounting. An unbalanced flow of material through a cavity formed with cantilever-mounted cores, and more particularly several cantilever-mounted core elements, results in the exertion of considerable stress upon the core. This stress has the obvious effect of shortening the useful life of the mold assembly and may actually shift the core and result in loss of dimensional stability.

To help achieve a balanced flow of injected material through the cavity, use is often made of what is commonly called a "short shot". This technique simply involves the introduction into the cavity at different times of different quantities of material none of which suffice to completely form the desired object. The partially formed objects produced by these short shots reveal whether some portions of the cavity receive relatively greater amounts of material than others; if so the need exists to alter the relative amounts of material flowing through the gates. The balancing process can continue until the "short shots" show the achievement of a balanced flow of plastic within the cavity.

However, the short-shot process has generally found use only in adjusting the molding apparatus prior to an actual production run. Upon the achieving of a balanced flow and the placing of the apparatus in continual production, the short-shot technique no longer finds use. This occurs for the obvious reason that the short-shot process precludes the apparatus from producing useful parts which thus incurs an economic loss. If the molded part appears satisfactory, the apparatus remains in production use and does not undergo testing.

Further, the plastic used in a short shot must then be discarded or reground for reintroduction into the molding process. The former alternative represents a loss of material and the latter a waste of time.

As an alternate to the short shot to aid in the initial adjustment, one manufacturer used pressure transducers in various portions of a cavity which has only a single gate for the introduction of material. These transducers apparently played a role similar to that of the short-shot technique; the output from the transducers could show the need for a modification of the overall cavity structure in order to achieve a balanced flow of material to the various extremities of the cavity. The utility of this technique, of course, like the short-shot process, ceases upon the placement of the apparatus into the actual production of the molded parts.

The U.S. Pat. No. 3,473,197 to R. W. Wilds et al. describes a modified apparatus for relieving some of the strains incurred in molding apparatus with cantilevered core elements. As described below in connection with FIGS. 1–4, this apparatus includes wedges which lock the various elements into a set position during most of the molding cycle. Nonetheless, the uneven introduction of material into this improved type of structure will shorten the useful life of the mold assembly.

SUMMARY

By including within the molding apparatus a sensing means responsive to the flow of material within the cavity and regulating means for adjusting the relative amounts of material entering the cavity through various gates, the desired balanced flow of material may be maintained over an extended production run. This sensing means finds a preferred location within the walls of the cavity defining the object produced by the apparatus. Basically, it should develop an indication of unbalanced flow conditions produced by the material injected into the cavity. It may do so by responding to the relative lapses of time between the injection of the material through the several openings into the cavity and the arrival of this material at separate locations within the cavity. These indications show if a disproportionately greater amount of material passing through one or more of the openings as compared to others has produced an unbalanced flow throughout the cavity.

In response to the sensing means, the regulating means may then adjust any of the conditions which determine the relative amounts of material passing through the different openings. For example, in a hot runner system, the regulating means may control the temperatures of the separate runners leading to the different openings; increasing the temperature of one of the runners permits a greater amount of material to pass through it and the opening to which it couples.

The sensing of the unbalanced flow conditions and the adjusting of the relative amounts of material passing through the openings in response to unbalanced flow conditions may occur during the actual production run of the molding apparatus. Neither step precludes the apparatus from producing a completely finished product. Both permit the simultaneous operation of the molding apparatus to produce finished products. Nonetheless, the performance of these operations will serve to achieve a proper flow of material through the cavity to avoid undesired stress lines particularly at corners, junctions of walls, and other irregular features. The balanced flow thus accomplished will also reduce the stresses exerted upon the core elements to extend their useful lives.

BRIEF DESCRIPTION OF THE DRAWINGS

FIG. 6a is a side view of the switch with FIG. 6b giving a top view of FIG. 6a and FIG. 6c being a sectional view turned 90° along the line 6c—6c in FIG. 6a.

DETAILED DESCRIPTION

An injection-molding apparatus typically includes two halves of the mold assembly. The cavity half generally remains fastened in place to the stationary die parts or press platens of the conventional injection-molding apparatus, while the core half adheres to the movable platen. The insertion of the core half into the cavity half defines a space or cavity corresponding to the desired molded object.

Figure 1:
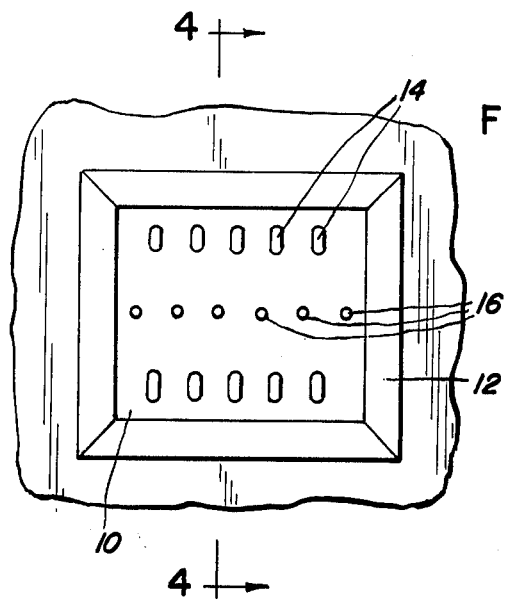
FIG. 1 is a fragmentary view of the cavity portion of an injection-molding apparatus.

In FIG. 1, the cavity half of the mold assembly for a six-cavity automotive battery case is shown. It includes a bottom cavity insert 10 and the cavity side cams 12. The cavity bottom insert 10 has the ten openings 14 for the introduction of stabilizing wedges mentioned below with regards to FIG. 4 and side openings (not shown) for end core locks. The additional six openings 16, generally called gates, allow for the introduction of material into the cavity during the molding process.

Figure 2:
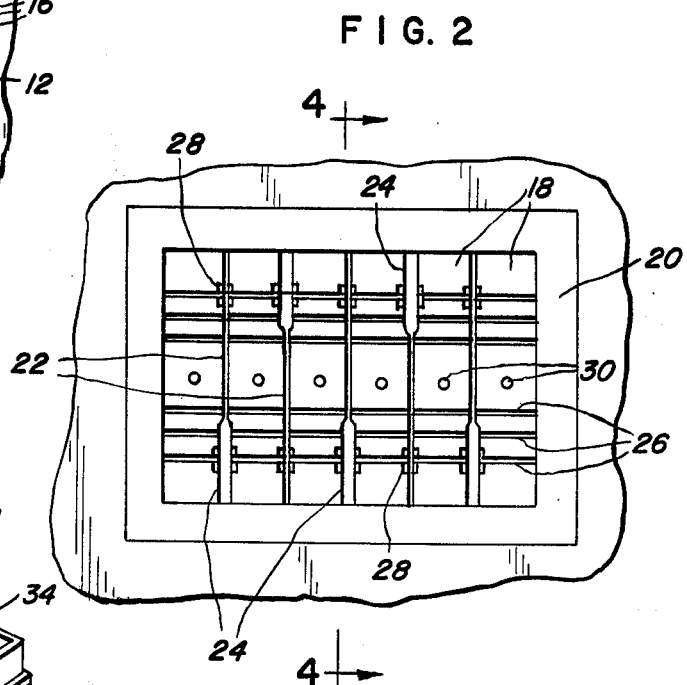
FIG. 2 is a perspective view of an array of core elements, which, although drawn on a different scale, fit within the cavity portion of FIG. 1, together with a section of the core-retainer plate.

The core array of FIG. 2 includes the six parallel cantilever-mounted core elements 18 suspended from the core retaining and supporting plate 20. The slots 22 between the core elements 18 extend the entire free length of the core and will produce walls in the final product which, in the present instance, is the battery case shown in FIG. 3. Each of the slots 22 has a thickened end 24 which also runs the entire length of the cores. These thickened portions 24 result in strengthened portions or buttresses at the portion of the walls through which connections between the adjoining cells of the battery pass as shown in U.S. Pat. No. 3,416,969. The shallow transverse slots 26 provide reinforcing ribs or mud rails at the base of the battery case.

Adjacent each side of the slots 22 there is a V-shaped slot 28 in the core ends. These allow for the introduction of the stabilizing wedges from openings 14 in mold part 10 during the molding process. The cores 18 also include concave indentations 30 which accommodate the convex gates 16 of the cavity portion of the mold of FIG. 1.

Figure 3:
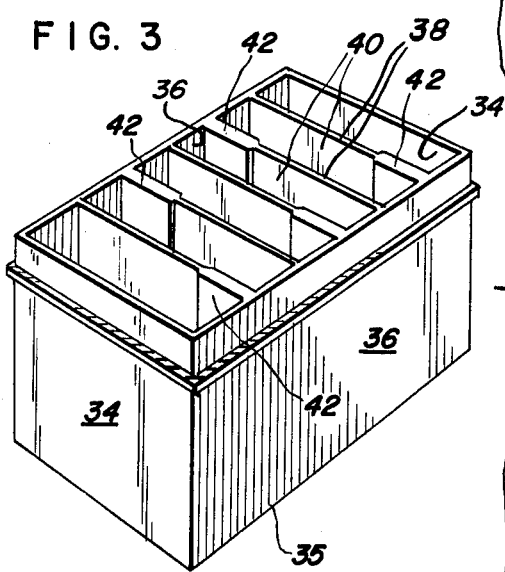
FIG. 3 is a perspective side view of a molded battery case produced by the molding apparatus of FIGS. 1, 2, and 4.

FIG. 3 shows a battery case 32 produced by the mold assembly of FIGS. 1 and 2. The battery case 32 includes the end walls 34, the side walls 36 and the bottom wall 35. The partition walls 38, with the strengthened buttresses 42, divide the battery case 32 into the separate compartments 40 which allow for the various cells of the battery.

Figure 4:
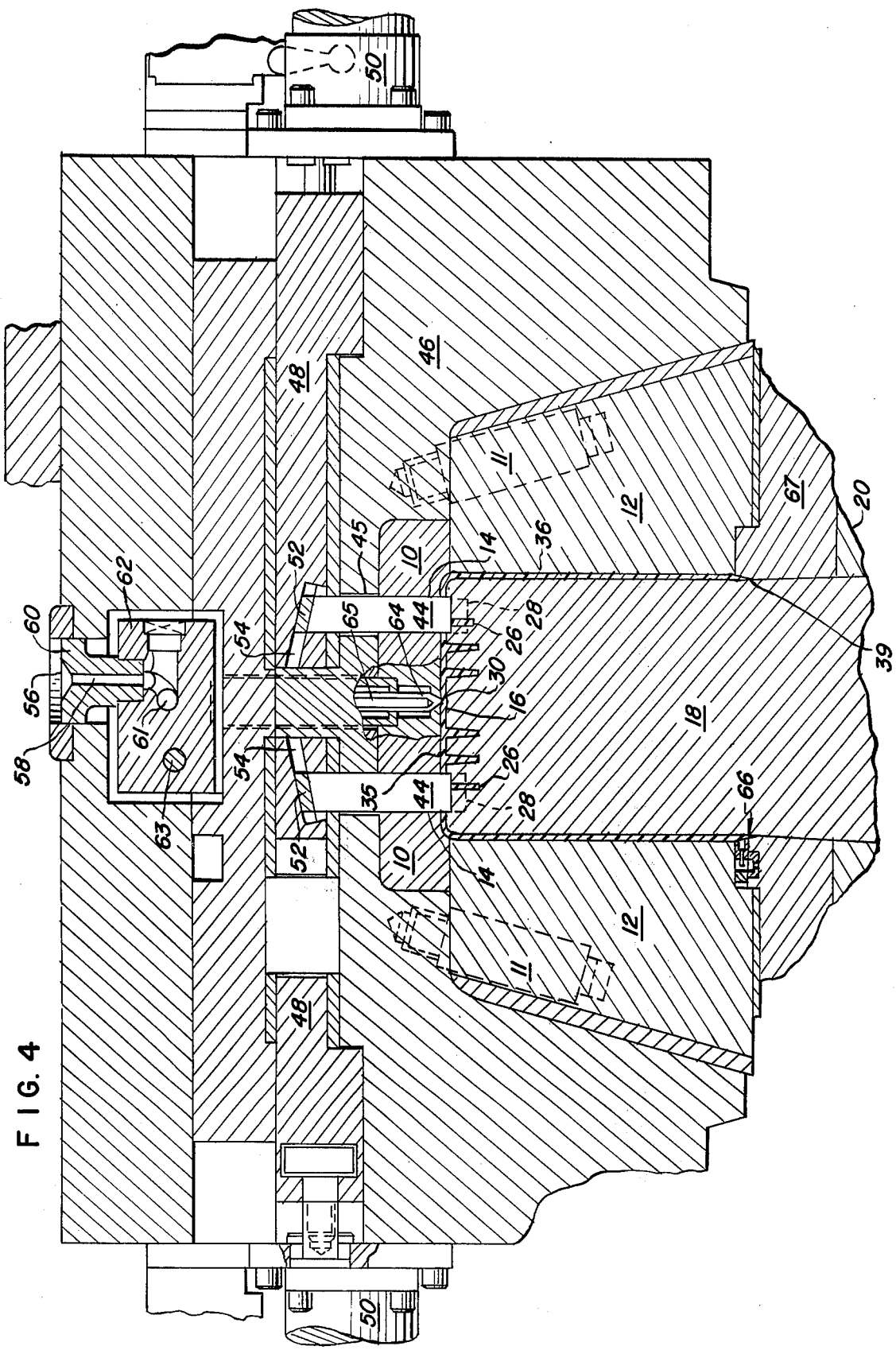
FIG. 4 gives a vertical sectional view along the line 4—4 of the molding apparatus of FIGS. 1 and 2 showing the core half of the apparatus inserted within the cavity half.

FIG. 4 gives a cross-sectional view along the lines 4—4 of FIGS. 1 and 2 showing the core assembly of the molding apparatus inserted within the cavity assembly. The cores 18 fit within the space defined by the bottom cavity insert 10 and the cavity side cams 12. The locator pins 11 (shown in phantom) properly position the bottom cavity insert 10 and the cavity side cams 12 with respect to each other.

As described in Wilds et al.'s U.S. Pat. No. 3,473,197, the stabilizing wedges 44 pass through apertures 45 in the cavity retaining block 46 and the openings 14 in the bottom cavity insert 10 and into the wedged apertures 28 between the core elements 18. As explained in that patent, lateral motion of the driver cams 48 produced by the hydraulic cylinders 50 operates upon the heads 52 of the wedges 44 within the slots 54 to produce vertical motion of the wedge members 44. This vertical motion allows for the stabilization of the core elements 18 by the wedges 44 during most of the molding process and for their subsequent removal from the cores 18 during the completion of the molding process.

The material forming the molded object, generally a thermoplastic such as a polyolefin, enters the molding apparatus through the indentation 56 into which the press nozzle (not shown) seats. It then flows into the main sprue 58 and passes through the sprue bushing 60 and into the elongated runners 61. In a hot runner system, the rectangular hot-runner bar 62 generally maintains sprue 58 and the runners 61 at a temperature at which the injected material will remain in a liquid form. The heater 63 provides sufficient heat in the runner bar 62 for this purpose.

Leaving the runner 61, the material flows along the secondary sprue 64 through the gate 16, and into the mold cavity. The heater element 65 maintains the sprue 64 at a temperature at which the injected material will remain liquid. The injected material passes through the several gates 16, throughout the cavity space defining the bottom 35 of the battery case depicted in FIG. 3, along the cavity space giving rise to the sides 34 and 36 and through the slots 22, to the top of the cavity corresponding to the top 39 of the battery case.

The flow of material from the bottom to the top of the cavity should generally proceed along lines normal to the bottom of the mold; once reaching the slots 22 or the cavity void corresponding to the walls 34 or 36, the flow should generally proceed directly from the bottom to the top, with a minimization of any sideways components of flow which would result, for example, in material flowing between the spaces for a sidewall 36 and an endwall 34 or between the spaces for a partition 38 and a sidewall 36. This type of unbalanced flow produces the deleterious results discussed above of stress lines at the junctures of various walls and the reduced lifetime of the cantilevered cores.

The first step in avoiding unbalanced flow conditions involves their detection. Many techniques would clearly suffice to accomplish this end. For example, detecting the amount of material passing through each of the gates 16 would provide an indication of the resulting flow patterns. Too much material passing through one gate relative to the others would cause the material to flow from that gate toward the others and produce the undesired unbalanced flow. Alternatively, the strain imposed upon the cores 18 or the wedge members 44 by an unbalanced flow could possibly provide the necessary indication.

Detecting the times of arrival of the injected material at separate locations of the cavity represents a facile method for determining the conditions of flow. A disproportionately greater amount of material passing through one or several of the gates than the others will produce a relatively shorter lapse of time from the introduction of the material until its arrival at locations closer to the gate with the greater flow than at other locations. This measuring technique represents the preferred method of developing the necessary indication inasmuch as it permits the use of simple detecting elements within the walls of the cavity which avoids any obstruction to the flow of material.

Various types of transducers can effectively develop the necessary indication of the desired arrival times. For example, the injected material generally consists of a thermoplastic with a sufficiently high temperature to keep it relatively non-viscous. Consequently, the injected material often has a higher temperature than the walls defining the cavity. Accordingly, temperature transducers located within these walls would indicate the arrival of the heated material at the various locations in the cavity.

Optical transducers or indicators can also produce the requisite information. For example, fibre bundles whose termini form part of the cavity wall will indicate visually the arrival of material.

FIG. 4 shows another type of transducer that will also serve to develop the desired indication of the arrival of material. The arrival of the injected material at any particular location, of course, increases the pressure exerted against the wall of the cavity. The pressure transducer 66 simply responds to this increased pressure and indicates the arrival of the material within its vicinity.

Most any location somewhat removed from the gates 16, will suffice for the placement of the pressure, thermal or other transducer. However, increasing their distance from the bottom of the cavity, which includes the gates, allows for the passage of greater amounts of time from the injection of the material until its arrival at the transducers. These longer time spans generally prove more sensitive to unbalanced flow conditions within the cavity. The top 10 percent of the cavity, i.e., the portion of the cavity lying at least 90 percent of the distance towards the top from the gates, represent the preferred location for the transducers, although the top 50 percent and less will give reliable results.

Figure 5:
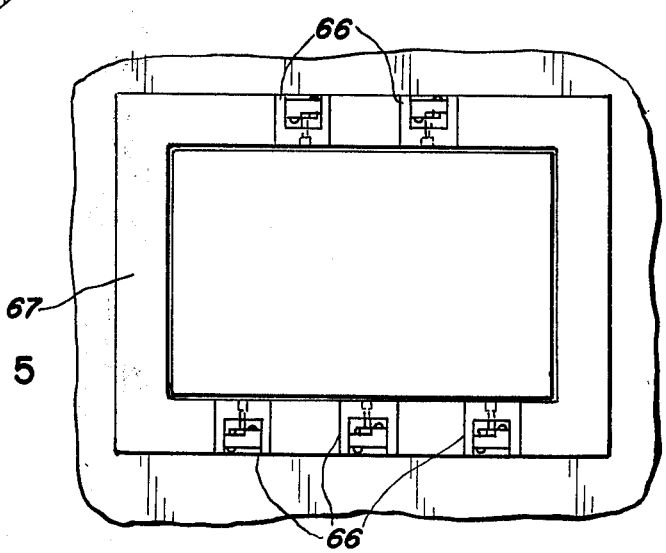
FIG. 5 shows the stripper plate of the molding apparatus of FIG. 4 including five of the pressure switches shown in detail in FIG. 6.

The molding apparatus of FIG. 4 includes a stripper plate 67 which helps remove the finished article from the mold. Locating the transducers 66 within the stripper plate 67, as shown in FIGS. 4 and 5, serves a number of different purposes. First, the stripper plate 67 represents a relatively small piece of the molding assembly and accordingly presents less difficulty in installing or working upon the transducers within them. Second, implanting the transducers within the stripper plate 67 generally results in their location near or within the desired top 10 percent of the cavity.

In the case of the mold assembly of FIGS. 1 and 2 for producing the multicompartmented battery case of FIG. 3, FIG. 5 gives a bottom view of the stripper plate 67 showing a convenient location of five pressure transducers 66 within itself. In FIG. 5, each of the five pressure transducers 66 sits adjacent to a slot 22 which produces a partition 38. The arrival of the material at the transducer thus results from the flow of material along the cavity spaces for the sidewalls 36 as well as those for the inner walls 38.

As a matter of choice, the transducer 66 may be located on the side of the slots 22 possessing the thickened portions 24 which provide for the buttresses 42 in the battery case 32. The injected material tends to flow faster through the thickened portions 24 of the slots 22. Locating the transducers near these thickened portions allows for the determination of the arrival of the plastic near the end of the forming of the article, but not precisely at the end where some minor variations within flow patterns may likely occur.

Actually, the location of the transducers 66 in FIG. 4 does not correspond to a location immediately adjacent one of the walls 38 of the battery case. Rather, the figure includes a slight offset of the transducer in order to illustrate its general location within the overall molding assembly.

Figure 6A:
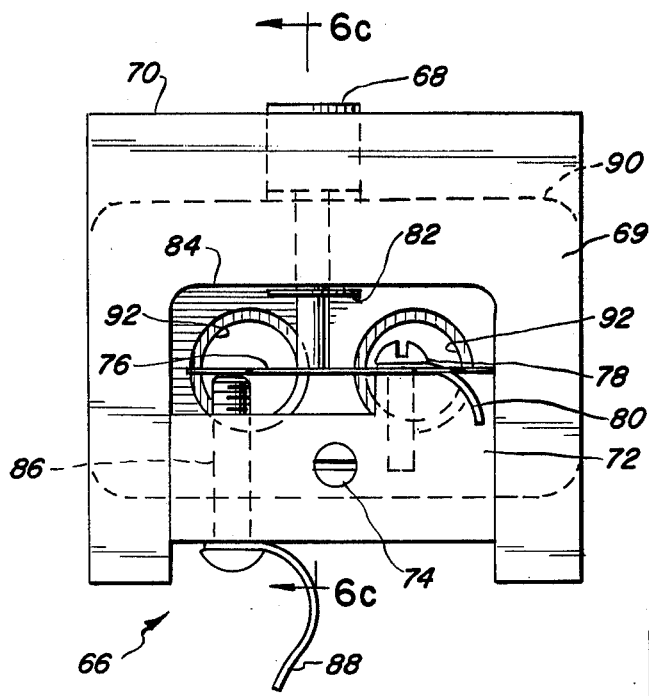
FIGS. 6a, b and c give different views of an on-off pressure sensitive switch module for use in the molding apparatus.
Figure 6C:
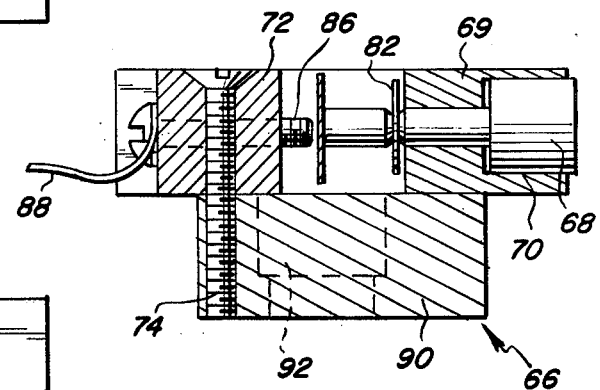
Figure 6B:
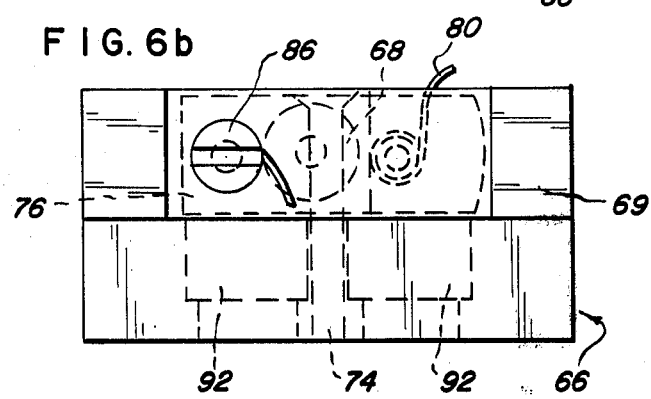

A quantitative pressure transducer will clearly provide the maximum amount of information obtainable from the arrival of the material in the desired vicinity. However, the on-off device actually shown in FIGS. 4 and 6 provides sufficient data for the control of the molding apparatus. This type of device or switch, as shown particularly in FIGS. 6a, b and c includes first a pin 68 set within the block 69. Maintaining the tolerance between the pin 68 and the block 69 to approximately 0.002 inch should preclude most injected materials from entering between the pin 68 and the block 69 while simultaneously permitting facile movement of the pin. The pin 68 extends slightly beyond the outer edge 70 of the block 69. The nylon block 72 sits within the metal block 69 and remains retained there by the screw 74. The screw 78 holds the flat spring 76 onto the nylon block 72. The screw 78 also retains the lead 80 in electrical contact with the spring 76. Preferably grounding the stripper plate will eliminate the need for the lead 80.

In the absence of injected material in the vicinity of the switch device 66, the spring 76 forces the head of the pin 68 out from the switch 66 so that it projects slightly into the actual cavity in an area corresponding to the wall 36 of the battery case 32. The retaining snap ring 82, which fits over a slight annular recess in the shank of the pin 68, abuts against the wall 84 of the block 69 to limit the outward projection of the pin 68. When the injected material actually reaches the switch 66, it forces the pin 68 inwards, which in turn pushes the spring 76 until it makes contact with the screw 86. This contact between the spring 76 and the screw 86 thus closes the switch 62 between the leads 80 and 88.

The indented shoulders 90 fit within a recess in the stripper plate 67 as seen in FIG. 4. Two screws, which pass through the counter-bored holes 92, retain the switch 66 within stripper plate 67.

The determination by the transducer of the existence of unbalanced flow conditions indicates the desirability for a correction of the relative amounts of material flowing through the different gates 16. Mechanical valves would obviously suffice to control the amount of material passing through each of these gates. However, they do display a susceptibility to sticking and becoming clogged with material and, of course, require mechanical actuation.

However, the quantity of a thermoplastic material that flows through a sprue or gate depends upon the temperature of that material. Effecting temperature changes near the gates will effectively alter the relative amounts of material admitted into the cavity. Increased temperatures reduce the viscosity of the material and allow more to pass through. Accordingly, the control of the relative amounts of material flowing through the gates 16 also may be accomplished by heat. In FIG. 4, temperature changes induced by the heater 65 within the sprue 64 for each of the gates 16 adjusts the amounts of material passing through the gates 16.

Figure 7:
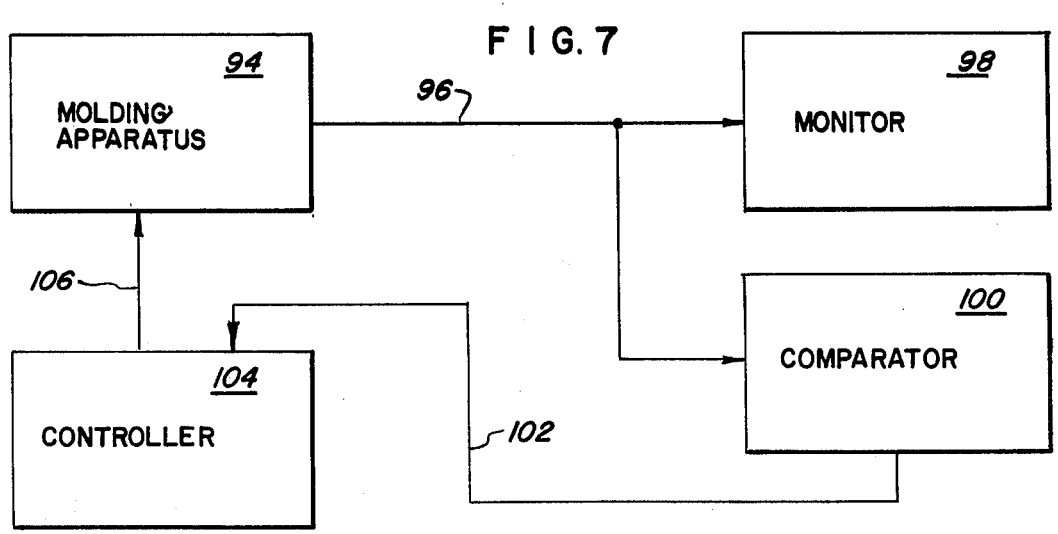
FIG. 7 diagrams a system in a molding apparatus for automating the response of the gate controllers to the output of the flow sensors.

While the above control of the molding apparatus admits of manual adjustment, nonetheless automated control appears preferable, especially in a large installation having many molding apparatuses. FIG. 7 illustrates generally the automated control of a mold assembly. The molding apparatus 94 both produces the desired parts and also develops the desired indications relating to the balanced or unbalanced conditions of flow of material through the cavity. It provides this indication along the connection 96 which can first pass to the monitor 98 for visual observation and also to the comparator 100 for automated control. The comparator 100 compares the actually received indications with a set of desired values. When the comparator 100 detects a deviation of a predetermined magnitude between the two sets of data, it will then signal the controller 104 along the connection 102 to make the necessary corrections. The controller 104 accomplishes this by altering the power inputs along the connection 106 to the six gate heaters and possible block heaters within the mold. Should a predetermined number of minor changes not effect the desired balance in the flow of material through the cavity, the comparator may then sound an alarm to indicate the possibility of a serious problem within the apparatus.

Accordingly, what is claimed is:

1. In an injection-molding apparatus for repetitively forming a molded article, said apparatus having surfaces defining a cavity and at least two openings for the injection of material into said cavity to form said molded article, the improvement which comprises:
   a. a plurality of sensing means forming part of said surfaces, said sensing means being spaced apart from one another and being spaced from said openings, each of said sensing means developing an indication of the arrival of said material thereat and thus the respective flow rate of said material through each of said openings into said cavity and of unbalanced flow conditions of the material injected into said cavity while forming said article;
   b. control means for measuring the time between the arrival of material at the respective sensing means; and
   c. regulating means for adjusting in response to a differential time indication from said control means the relative amounts of material passing through each of said openings into said cavity while forming a subsequent article.

2. The improvement of claim 1 wherein said plurality of sensing means are located within said surfaces and develop an indication of the relative lapses of time between the injection of material through said openings and the arrival of the injected material at separate sensing means locations within said cavity.

3. The improvement of claim 2 wherein each of said sensing means comprises a pressure-sensitive device responsive to the presence in close proximity to said device of said injected material.

4. The improvement of claim 3 wherein said pressure-sensitive devices are on-off switches.

5. The improvement of claim 2 in a molding apparatus which includes a hot runner system.

6. In an apparatus in which said cavity has a top portion and a bottom portion and said openings are in one of said cavity portions, the improvement of claim 2 wherein said sensing means is located about at least 90% of the distance toward the other of said portions from said openings.

7. The improvement of claim 2 wherein said molding apparatus includes a stripper plate and said sensing means forms part of said stripper plate.

8. The improvement of claim 2 including means coupled to said sensing means and to said regulating means for causing said regulating means to automtically respond to the indications developed by said sensing means.

9. The improvement of claim 2 wherein said regulating means effects temperature adjustments of said apparatus in a region in close proximity to said openings.

10. In an injection-molding apparatus having
    1. surfaces defining a cavity corresponding to a multi-compartmented battery case; and
    2. at least two openings for the injection of material into said cavity, the improvement which comprises:
       a. a plurality of pressure-sensitive means located within said surfaces for developing an indication of the relative lapses of time between the injection of material through said openings into said cavity and the arrival of said injection material at separate locations of said pressure-sensitive means within said cavity, each of said pressure-sensitive means being responsive to the close proximity of said injected material to said pressure-sensitive means; and
       b. control means measuring the time interval between the respective actuations of said pressure-sensitive means and generating a control signal representative of said interval; and
       c. regulating means for adjusting in response to said control signal the relative amounts of material passing through said respective openings into said cavity.

11. The improvement of claim 10 wherein said pressure-sensitive means are at least two on-off devices.

12. In a molding apparatus including a stripper plate the improvement of claim 11 wherein said pressure-sensitive means forms part of said stripper plate.

13. The improvement of claim 12 in a molding apparatus which includes a hot runner system and in which said regulating means effects temperature adjustments of said apparatus in a region in close proximity to said openings.

14. In an apparatus in which the shape of said cavity corresponds to a multicompartmented battery case having buttresses in the dividers between the compartments the improvement of claim 13 wherein said pressure-sensitive means within said stripper plate is located above the portion of said cavity corresponding to said buttresses.

15. In an injection-molding apparatus for repetitively forming a molded cavitated article, said apparatus having surfaces defining a cavity, multi-sided core means supported within the cavity so that the spatial separation between said surfaces and said core means defines the form of said molded article, and at least two openings for the injection of material into said defined form in said cavity to form said molded article, the improvement which comprises:
   a. a plurality of sensing means spaced apart from one another and being spaced from said openings and forming part of said surfaces, each of said sensing means having portions thereof exposed to said spatial separation to separately sense the time of arrival of material from at least one of said openings;
   b. means connected to said sensing means for measuring and comparing the time between the arrival of material at the respective sensing means; and
   c. means connected to said measuring and comparing means and responsive to a differential time and indication therefrom for adjusting the relative amounts of material passing through each of said openings in a subsequent molding cycle.

16. The improvement of claim 15 wherein said multi-sided core means comprises a plurality of cantilever mounted core elements for forming a multi-cavitated molded article.

* * * * *

UNITED STATES PATENT AND TRADEMARK OFFICE
CERTIFICATE OF CORRECTION

PATENT NO. : 3,969,055
DATED : July 13, 1976
INVENTOR(S) : Paul J. Buckethal

It is certified that error appears in the above-identified patent and that said Letters Patent are hereby corrected as shown below:

In the references cited:

"No. 3,820,928 (2nd occurrence) Hehl" should be cancelled.

In the claims:

Col. 8, line 17 (Claim 7) "The improvement of claim 2" should be --The improvement of claim 6--

Col. 8, line 22 (Claim 8) "automtically" should be --automatically--

Signed and Sealed this

Fifth Day of October 1976

[SEAL]

Attest:

RUTH C. MASON
Attesting Officer

C. MARSHALL DANN
Commissioner of Patents and Trademarks